(12) United States Patent
Wu et al.

(10) Patent No.: US 11,686,963 B2
(45) Date of Patent: Jun. 27, 2023

(54) DISPLAY MODULE FOR ACHIEVING SEAMLESS SPLICING DISPLAY, METHOD FOR MANUFACTURING SAME, AND DISPLAY DEVICE

(71) Applicants: Beijing BOE Display Technology Co., Ltd., Beijing (CN); BOE Technology Group Co., Ltd., Beijing (CN)

(72) Inventors: Bin Wu, Beijing (CN); Zhaoshou Tian, Beijing (CN); Enliang Zhang, Beijing (CN); Haijun Shi, Beijing (CN); Bochang Wang, Beijing (CN); Dan Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/582,559

(22) Filed: Jan. 24, 2022

(65) Prior Publication Data

US 2022/0299812 A1    Sep. 22, 2022

(30) Foreign Application Priority Data

Mar. 17, 2021 (CN) .......................... 202110285943.3

(51) Int. Cl.
*G02F 1/1333* (2006.01)
*G02F 1/03* (2006.01)
*G02F 1/1339* (2006.01)

(52) U.S. Cl.
CPC ........ *G02F 1/13336* (2013.01); *G02F 1/0311* (2013.01); *G02F 1/13394* (2013.01); *G02F 1/133342* (2021.01); *G02F 1/133388* (2021.01); *G02F 1/133391* (2021.01)

(58) Field of Classification Search
CPC combination set(s) only.
See application file for complete search history.

(56) References Cited

U.S. PATENT DOCUMENTS

| | | | |
|---|---|---|---|
| 2010/0002018 A1* | 1/2010 | Hirata | G09G 5/028 348/790 |
| 2011/0102302 A1* | 5/2011 | Watanabe | G09F 9/30 359/804 |
| 2021/0358347 A1 | 11/2021 | Jiang et al. | |

FOREIGN PATENT DOCUMENTS

CN           110379314 A    10/2019

* cited by examiner

*Primary Examiner* — Lauren Nguyen
(74) *Attorney, Agent, or Firm* — Ipro, PLLC

(57) ABSTRACT

Provided is a display module. The display module includes a first display panel including a first edge sealing region; a second display panel including a second edge sealing region, wherein the second display panel and the first display panel are disposed in a same layer and spliced with each other, and the second edge sealing region is abutted against the first edge sealing region; and a third display panel disposed on backlight sides of the first display panel and the second display panel, wherein both an orthographic projection of the first edge sealing region onto the third display panel and an orthographic projection of the second edge sealing region onto the third display panel fall within a display region of the third display panel; wherein the first display panel, the second display panel and the third display panel are all liquid-crystal display panels.

16 Claims, 7 Drawing Sheets

US 11,686,963 B2

DISPLAY MODULE FOR ACHIEVING SEAMLESS SPLICING DISPLAY, METHOD FOR MANUFACTURING SAME, AND DISPLAY DEVICE

CROSS-REFERENCE TO RELATED APPLICATION

The present disclosure claims priority to the Chinese patent application No. 202110285943.3, filed on Mar. 17, 2021 and entitled "DISPLAY PANEL AND DISPLAY DEVICE," the disclosure of which is herein incorporated by reference in its entirety.

TECHNICAL FIELD

The present disclosure relates to a display module, a method for manufacturing the same, and a display device.

BACKGROUND

With the integration and development of display technologies and control technologies, ultra-large pictures, multi-screen display, and definite and realistic display effects have made command monitoring organizations, commercial centers, high-end conferences, private theaters and other industries crazy for ultra-large-sized display screens. However, in the field of high-end large-screen display, the production cost of the ultra-large-sized display screen (e.g., a display screen of greater than 100 inches) is much higher than the production cost of a large-sized display screen (e.g., a display screen of 55 inches), and the maximum size of a current display screen is generally 110 inches due to technological limitations. Therefore, large-screen display using a multi-screen splicing technology has been widely applied.

SUMMARY

Embodiments of the present disclosure provide a display module, a method for manufacturing the same, and a display device.

In a first aspect of the embodiments of the present disclosure, a display module is provided.

The display module includes: a first display panel including a first edge sealing region second display panel including a second edge sealing region, wherein the second display panel and the first display panel are disposed in a same layer and spliced with each other, and the second edge sealing region is abutted against the first edge sealing region and a third display panel disposed on backlight sides of the first display panel and the second display panel, wherein both an orthographic projection of the first edge sealing region onto the third display panel and an orthographic projection of the second edge sealing region onto the third display panel fall within a display region of the third display panel; wherein the first display panel, the second display panel and the third display panel are all liquid crystal display (LCD) panels.

In some embodiments, a plurality of sub-pixels are disposed in a display region of the first display panel, a display region of the second display panel, and the display region of the third display panel; an orthographic projection of the display region of the first display panel onto a reference plane is partially overlapped with an orthographic projection of the display region of the third display panel onto the reference plane, and sub-pixels with overlapped orthographic projections in the first display panel and the third display panel are of a same color; an orthographic projection of the display region of the second display panel onto the reference plane is partially overlapped with the orthographic projection of the display region of the third display panel onto the reference plane, and the sub-pixels with overlapped orthographic projections in the second display panel and the third display panel are of a same color; wherein the reference plane is parallel to a display surface of the display module.

In some embodiments, the third display panel includes a dimming region; and an orthographic projection of a display region of at least one of the first display panel and the second display panel onto a reference plane is at least partially overlapped with an orthographic projection of the dimming region onto the reference plane, wherein the reference plane is parallel to a display surface of the display module; wherein the dimming region is configured to adjust light incident onto the at least one display panel.

In some embodiments, a plurality of sub-pixels are disposed in the display region of the first display panel and the display region of the second display panel, and a plurality of dimming units are disposed in the dimming region, wherein the plurality of dimming units are in one-to-one correspondence to the plurality of sub-pixels in the at least one display panel; and each of the dimming units is configured to adjust light incident onto the corresponding sub-pixel.

In some embodiments, the third display panel includes a third edge sealing region; and the display module further includes: a dimming LCD panel including a fourth edge sealing region; wherein the dimming LCD panel and the third display panel are disposed in a same layer and spliced with each other, and the fourth edge sealing region is abutted against the third edge sealing region; and an orthographic projection of a display region of at least one of the first display panel and the second display panel onto a reference plane is at least partially overlapped with an orthographic projection of a dimming region of the dimming LCD panel onto the reference plane, wherein the reference plane is parallel to a display surface of the display module.

In some embodiments, a plurality of sub-pixels are disposed in both the display region of the first display panel and the display region of the second display panel, and the dimming LCD panel includes a plurality of dimming units, wherein the plurality of dimming units are in one-to-one correspondence to the plurality of sub-pixels in the at least one display panel, and each of the plurality of dimming units is configured to adjust light incident onto the corresponding sub-pixel.

In some embodiments, a splicing seam between the first display panel and the second display panel is a first splicing seam; and a splicing seam between the third display panel and the dimming LCD panel is a second splicing seam; wherein a distance between the first splicing seam and the second splicing seam is 1 to 4 times of a pixel width; wherein the pixel width is a width of the pixel unit in the first display panel, the second display panel or the third display panel, and the pixel unit in any one of the first display panel, the second display panel, and the third display panel is composed of at least two adjacent sub-pixels.

In some embodiments, the display module further includes: a light adjusting layer disposed on light-emitting sides of the first display panel and the second display panel and configured to adjust uniformity of outgoing light of the first display panel and the second display panel.

In some embodiments, the light adjusting layer includes: a first sub-adjusting layer including a first curved portion, and disposed on the light-emitting side of the first display panel, wherein an orthographic projection of the first curved portion onto the first display panel covers the first edge sealing region; and a second sub-adjusting layer including a second curved portion, and disposed on the light-emitting side of the second display panel, wherein an orthographic projection of the second curved portion onto the second display panel covers the second edge sealing region.

In some embodiments, the first edge sealing region and the second edge sealing region are connected by a transparent protective adhesive, and the third edge sealing region and the fourth edge sealing region are also connected by the transparent protective adhesive.

In some embodiments, the display module further includes: a first polarizer disposed on light-emitting sides of the first display panel and the second display panel and provided with a first opening, wherein an orthographic projection of the first opening onto the reference plane covers orthographic projections of the first edge sealing region and the second edge sealing region onto the reference plane; a second polarizer disposed on backlight sides of the third display panel and the dimming LCD panel, and provided with a second opening, wherein an orthographic projection of the second opening onto the reference plane covers orthographic projections of the third edge sealing region and the fourth edge sealing region onto the reference plane; and a third polarizer disposed on the backlight sides of the first display panel and the second display panel, and disposed on the light-emitting sides of the third display panel and the dimming LCD panel; wherein a direction of a polarization axis of the first polarizer is parallel to a direction of a polarization axis of the second polarizer, and is perpendicular to a direction of a polarization axis of the third polarizer, In some embodiments, a plurality of sub-pixels are disposed in a display region of the first display panel, a display region of the second display panel, and the display region of the third display panel; wherein an orthographic projection of the display region of the first display panel onto a reference plane is partially overlapped with an orthographic projection of the display region of the third display panel onto the reference plane; an orthographic projection of the display region of the second display panel onto the reference plane is partially overlapped with the orthographic projection of the display region of the third display panel onto the reference plane; and the sub-pixels in the first display panel and the third display panel, and sub-pixels with overlapped orthographic projections in the second display panel and the third display panel are of a same color; and the reference plane is parallel to a display surface of the display module;

the third display panel includes a dimming region, and the third display panel includes a third edge sealing region; and the display module further includes:

a dimming LCD panel including a fourth edge sealing region, wherein the dimming LCD panel and the third display panel are disposed in a same layer and spliced with each other, and the fourth edge sealing region is abutted against the third edge sealing region; wherein a distance between a splicing seam between the first display panel and the second display panel, and a splicing seam between the third display panel and the dimming LCD panel is 1 to 4 times of a pixel width; orthographic projections of the display region of the first display panel and the display region of the second display panel onto the reference plane are at least partially overlapped with an orthographic projection of the dimming region of the third display panel onto the reference plane; and the orthographic projection of the display region of the second display panel onto the reference plane is at least partially overlapped with an orthographic projection of a dimming region of the dimming LCD panel onto the reference plane;

a light adjusting layer including a first sub-adjusting layer and a second sub-adjusting layer, wherein the first sub-adjusting layer includes a first curved portion and is disposed on a light-emitting side of the first display panel, wherein an orthographic projection of the first curved portion onto the first display panel covers the first edge sealing region; and the second sub-adjusting layer includes a second curved portion, and is disposed on a light-emitting side of the second display panel, wherein an orthographic projection of the second curved portion onto the second display panel covers the second edge sealing region, an orthographic projection of the second curved portion onto the third display panel covers the third edge sealing region, and an orthographic projection of the second curved portion onto the dimming LCD panel covers the fourth edge sealing region; and a first polarizer, a second polarizer, and a third polarizer, wherein the first polarizer is disposed on the light-emitting sides of the first display panel and the second display panel, and is provided with a first opening, wherein an orthographic projection of the first opening onto the reference plane covers orthographic projections of the first edge sealing region and the second edge sealing region onto the reference plane; the second polarizer is disposed on backlight sides of the third display panel and the dimming LCD panel, and is provided with a second opening, wherein an orthographic projection of the second opening onto the reference plane covers orthographic projections of the third edge sealing region and the fourth edge sealing region onto the reference plane; the third polarizer is disposed on the backlight sides of the first display panel and the second display panel, and is disposed on the light-emitting sides of the third display panel and the dimming LCD panel; wherein a direction of a polarization axis of the first polarizer is parallel to a direction of a polarization axis of the second polarizer, and is perpendicular to a direction of a polarization axis of the third polarizer.

In a second aspect of the embodiments of the present disclosure, a method for manufacturing a display module is provided.

The method includes: manufacturing a first display panel, a second display panel, and a third display panel, wherein the first display panel, the second display panel, and the third display panel are all LCD panels, the first display panel includes a first edge sealing region, and the second display panel includes a second edge sealing region; disposing the first display panel and the second display panel in a same layer and splicing the first display panel and the second display panel, such that the first edge sealing region is abutted against the second edge sealing region; and disposing the third display panel on backlight sides of the first display panel and the second display panel, such that both an orthographic projection of the first edge sealing region onto the third display panel and an orthographic projection of the second edge sealing region onto the third display panel to fall within a display region of the third display panel.

In some embodiments, the third display panel includes a dimming region; and disposing the third display panel on the backlight sides of the first display panel and the second display panel further includes: disposing the third display panel on backlight sides of the first display panel and the second display panel, such that an orthographic projection of a display region of at least one of the first display panel and the second display panel onto a reference plane is at least partially overlapped with an orthographic projection of the dimming region onto the reference plane, wherein the reference plane is parallel to a display surface of the display module.

In some embodiments, the third display panel includes a third edge sealing region; and the method further includes: manufacturing a dimming LCD panel including a fourth edge sealing region; and disposing the dimming LCD panel and the third display panel in a same layer and splicing the dimming LCD panel and the third display panel, such that the fourth edge sealing region is abutted against the third edge sealing region, wherein an orthographic projection of a display region of at least one of the first display panel and the second display panel onto a reference plane is at least partially overlapped with an orthographic projection of a dimming region of the dimming LCD panel onto the reference plane.

In some embodiments, the method further includes: forming a light adjusting layer on light-emitting sides of the first display panel and the second display panel.

In some embodiments, forming the light adjusting layer on the light-emitting sides of the first display panel and the second display panel includes: forming a first sub-adjusting layer on a light-emitting side of the first display panel, wherein the first sub-adjusting layer includes a first curved portion, an orthographic projection of the first curved portion onto the first display panel covering the first edge sealing region; and forming a second sub-adjusting layer on a light-emitting side of the second display panel, wherein the second sub-adjusting layer includes a second curved portion, an orthographic projection of the second curved portion onto the second display panel covering the second edge sealing region.

In some embodiments, the method further includes: forming a first polarizer on the light-emitting sides of the first display panel and the second display panel, wherein the first polarizer is provided with a first opening therein, an orthographic projection of the first opening onto the reference plane covering orthographic projections of the first edge sealing region and the second edge sealing region onto the reference plane; forming a second polarizer on backlight sides of the third display panel and the dimming LCD panel, wherein the second polarizer is provided with a second opening, an orthographic projection of the second opening onto the reference plane covering orthographic projections of the third edge sealing region and the fourth edge sealing region onto the reference plane; and forming a third polarizer between the backlight sides of the first display panel and the second display panel, and light-emitting sides of the third display panel and the dimming LCD panel; wherein a direction of a polarization axis of the first polarizer is parallel to a direction of a polarization axis of the second polarizer, and is perpendicular to a direction of a polarization axis of the third polarizer.

In a third aspect of the embodiments of the present disclosure, a display device is provided. The display device includes the display module as described in the first aspect or any optional embodiment of the first aspect.

In some embodiments, the display device further includes: a front frame including a front frame bending portion parallel to the first display panel; and a light-shielding foam disposed between the front frame bending portion and the first display panel.

In some embodiments, the display module further includes a dimming LCD panel; and a splicing seam between the first display panel and the second display panel is a first splicing seam, and a splicing seam between the third display panel and the dimming LCD is a second splicing seam, wherein a width of the front frame bending portion is greater than or equal to a distance between the first splicing seam and the second splicing seam.

DETAILED DESCRIPTION

Figure 1:
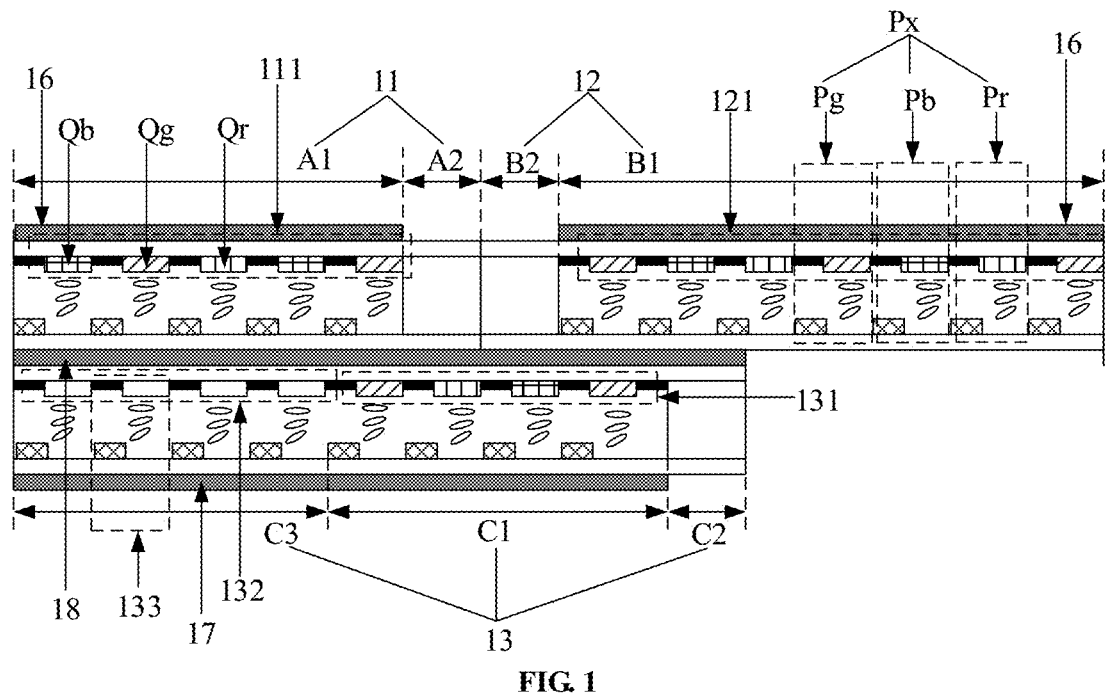
FIG. 1 is a schematic structural diagram of a display module according to an embodiment of the present disclosure.

The technical solutions of the present disclosure are described in detail hereinafter with reference to the embodiments and accompanying drawings.

Technical terms or scientific terms used in the present disclosure shall have ordinary meaning as understood by those of ordinary skill in the art to which the present disclosure pertains. The terms "first," "second," and the like used in the present disclosure are not intended to indicate any order, quantity, or importance, but are merely used to distinguish different components. The terms "comprise," "includes," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "upper," "lower," "left," "right," and the like are merely used to indicate the relative positional relationship, and in the case that the absolute position of the described object changes, the relative positional relationship may also change accordingly.

With the development of the display technologies and control technologies, large-screen display using a multi-screen splicing technology has been widely applied. As a liquid-crystal display (LCD) screen possesses the characteristics of high luminance, high color saturation, high contrast and the like, an LCD spliced screen (i.e., a spliced screen formed by splicing LCD screens) is a generally used spliced screen currently. Because of the fluidity of liquid crystals, it is necessary for the LCD spliced screen to seal the liquid crystals in a specific region using a frame sealant, and a region of the LCD spliced screen corresponding to the frame sealant cannot be used for display. In addition, in the process of manufacturing the LCD screen, an LCD motherboard needs to be cut to acquire an LCD panel. In the cutting process, a certain distance needs to be reserved around the LCD panel to ensure that a pixel region of the LCD panel can be displayed normally. These reasons lead to an inevitable splicing seam in the LCD spliced screen, which adversely affects the display effect of the LCD spliced screen.

In the related art, a glass cover plate with a microprism structure is generally adopted to disperse light on the surface of the LCD spliced screen, so as to weaken the influence of the splicing seam of the LCD spliced screen on the display effect. However, the microprism structure may interfere with outgoing light of the LCD spliced screen, thereby resulting in undesirable rainbow patterns and moire patterns on a picture of the LCD spliced screen.

In the related art, the LCD spliced screen can also be replaced with an LED spliced screen formed by splicing light-emitting diode (LED) display screens of mini LED/Micro LEDs. However, the transfer printing process of the Mini LED/Micro LEDs is low in yield and high in cost, which greatly restricts popularization of the LED spliced screen.

An embodiments of the present disclosure provides a display module, which may be an LCD spliced screen. The display module is formed by splicing at least two display panels, can achieve the seamless splicing display (i.e., there is no splicing seam in a displayed picture), and has no defects such as rainbow patterns and moire patterns. In addition, the display module is low in cost. The display module according to the embodiments of the present disclosure is introduced hereinafter in conjunction with the accompanying drawings.

Referring to FIG. 1, FIG. 1 is a schematic structural diagram of a display module according to an embodiment of the present disclosure. The display module includes a first display panel 11, a second display panel 12, and a third display panel 13, which are all LCD panels and may be configured to display.

The first display panel 11 includes a display region A1 and a first edge sealing region A2, the display region A1 may be disposed at the center of the first display panel 11, and the first edge sealing region A2 is disposed at an edge of the first display panel 11. The first edge sealing region A2 may seal the edge by a transparent frame sealant, and the first edge sealing region A2 is a transparent region. The second display panel 12 includes a display region B1 and a second edge sealing region B2, the display region B1 may be disposed at the center of the second display panel 12, and the second edge sealing region B2 is disposed at an edge of the second display panel 12. The second edge sealing region B2 may seal the edge by the transparent frame sealant, and the second edge sealing region B2 is a transparent region. The first display panel 11 and the second display panel 12 are disposed in a same layer and spliced with each other, the first edge sealing region A2 is abutted against the second edge sealing region B2, and a display surface of the first display panel 11 and a display surface of the second display panel 12 are disposed on a same side. Thus, the first display panel 11 and the second display panel 12 may be spliced to form a larger-sized display panel.

The third display panel 13 includes a display region C1 and is disposed on backlight sides of the first display panel 11 and the second display panel 12, and a display surface of the third display panel 13 faces towards the first display panel 11 and the second display panel 12. An orthographic projection of the first edge sealing region A2 onto the third display panel 13 and an orthographic projection of the second edge sealing region B2 onto the third display panel 13 fall within the display region C1 of the third display panel 13. Therefore, the outgoing light of the display region C1 of the third display panel 13 may pass through the first edge sealing region A2 and the second edge sealing region B2, and the light passed through the first edge sealing region A2 and the second edge sealing region B2 may be combined with the outgoing light of the first display panel 11 and the outgoing light of the second display panel 12 to achieve display, thereby visually forming a complete display content. Therefore, the first edge sealing region A2 and the second edge sealing region B2 are compensated by the display region C1 of the third display panel 13, such that regions in the spliced display module corresponding to the first edge sealing region A2 and the second edge sealing region B2 may further achieve display, and the display content of the display module is complete and free from splicing seams.

In summary, in the display module according to the embodiment of the present disclosure, as the first display panel and the second display panel are disposed in the same layer and spliced with each other, the first edge sealing region of the first display panel is abutted against the second edge sealing region of the second display panel, the third display panel is disposed on the backlight sides of the first display panel and the second display panel, and the orthographic projection of the first edge sealing region onto the third display panel and the orthographic projection of the second edge sealing region onto the third display panel fall within the display region of the third display panel, the display region of the third display panel may supplement the first edge sealing region and the second edge sealing region, and the display content of the third display panel may compensate the display content of the first display panel and the display content of the second display panel, such that the display content of the display module is complete and seamless, and the display module according to the present disclosure may achieve seamless display.

In the embodiments of the present disclosure, the display region A1 of the first display panel 11, the display region B1 of the second display panel 12, and the display region C1 of the third display panel 13 include a plurality of sub-pixels, and the sub-pixels in each display panel may include a red (R) sub-pixel, a green (G) sub-pixel, and a blue (B) sub-pixel. For example, the red sub-pixel Pr, the green sub-pixel Pg, and the blue sub-pixel Pb in the display region B1 of the second display panel 12 are marked in FIG. 1, and the sub-pixels in the first display panel 11 and the sub-pixels in the third display panel 13 may be referred to the sub-pixels in the second display panel 12, which are not marked in FIG. 1 for brevity. In some embodiments, an orthographic projection of the display region A1 of the first display panel 11 onto a reference plane (not shown in FIG. 1) is partially overlapped with an orthographic projection of the display region C1 of the third display panel 13 onto the reference plane, and sub-pixels with overlapped orthographic projections in the first display panel 11 and the third display panel 13 are of a same color. An orthographic projection of the display region B1 of the second display panel 12 onto the reference plane is partially overlapped with the orthographic projection of the display region C1 of the third display panel 13 onto the reference plane, and sub-pixels with overlapped orthographic projections in the first display panel 12 and the third display panel 13 are of a same color. In this way, the outgoing light of the display region C1 of the third display panel 13 may be prevented from adversely affecting the first display panel 11 and the second display panel 12. The reference plane is parallel to the display surface of the display module. For example, the reference plane is a plane disposed with the display surface of any one of the first display panel 11, the second display panel 12, and the third display panel 13.

In some embodiments, as shown in FIG. 1, the display region A1 of the first display panel 11 includes a first color resistor array 111, the display region B1 of the second display panel 12 includes a second color resistor array 121, and the display region C1 of the third display panel 13 includes a third color resistor array 131. Each of the first color resistor array 111, the second color resistor array 121, and the third color resistor array 131 includes a red color resistor block, a green color resistor block, and a blue color resistor block. For example, the red color resistor block Qr, the green color resistor block Qg, and blue color resistor block Qb in the first display panel 11 are marked in FIG. 1, and the color resistor blocks in the second display panel 12 and the color resistor blocks in the third display panel 13 may be referred to the color resistor blocks in the first display panel 11, which are not marked in FIG. 1 for brevity. The red sub-pixel in the first display panel 11 includes the red color resistor block Qr in the first color resistor array 111, the green sub-pixel in the first display panel 11 includes the green color resistor block Qg in the first color resistor array 111, and the blue sub-pixel in the first display panel 11 includes the blue color resistor block Qb in the first color resistor array 111. The red sub-pixel in the second display panel 12 includes the red color resistor block Qr in the second color resistor array 121, the green sub-pixel in the second display panel 12 includes the green color resistor block Qg in the second color resistor array 121, and the blue sub-pixel in the second display panel 12 includes the blue color resistor block Qb in the second color resistor array 121. The red sub-pixel in the third display panel 13 includes the red color resistor block Qr in the third color resistor array 131, the green sub-pixel in the third display panel 13 includes the green color resistor block Qg in the third color resistor array 131, and the blue sub-pixel in the third display panel 13 includes the blue color resistor block Qb in the third color resistor array 131. An orthographic projection of the first color resistor array 111 onto the reference plane is partially overlapped with an orthographic projection of the third color resistor array 131 onto the reference plane, and color resistor blocks with overlapped orthographic projections in the first color resistor array 111 and the third color resistor array 131 are of a same color, such that sub-pixels with overlapped orthographic projections in the first display panel 11 and the third display panel 13 are of a same color. An orthographic projection of the second color resistor array 121 onto the reference plane is partially overlapped with an orthographic projection of the third color resistor array 131 onto the reference plane, and color resistor blocks with overlapped orthographic projections in the second color resistor array 121 and the third color resistor array 131 are of a same color, such that sub-pixels with overlapped orthographic projections in the second display panel 12 and the third display panel 13 are of a same color. In the embodiments of the present disclosure, each of the first display panel 11, the second display panel 12, and the third display panel 13 includes an array substrate and a color film substrate. The first color resistor array 111 may be disposed on the color film substrate of the first display panel 11, the second color resistor array 121 may be disposed on the color film substrate of the second display panel 12, and the third color resistor array 131 may be disposed on the color film substrate of the third display panel 13.

In the embodiments of the present disclosure, in any one of the first display panel 11, the second display panel 12, and the third display panel 13, at least two adjacent sub-pixels constitute one pixel unit. For example, as shown in FIG. 1, the adjacent red sub-pixel Pr, sub-pixel Pg, and sub-pixel Pb in the second display panel 12 constitute one pixel unit Px. The pixel units in the first display panel 11, the second display panel 12, and the third display panel 13 may be of the same or similar structures. The pixel units are of the same structure, which means that the red sub-pixels, the green sub-pixels, and the blue sub-pixels in each pixel unit are of the same or similar numbers, positions, sizes, and distances. In some embodiments, the resolutions of the first display panel 11, the second display panel 12, and the third display panel 13 are the same, and the resolution of any display panel refers to the number of the pixel units per unit region in the display panel. In the embodiments of the present disclosure, a case that the orthographic projection of the display region A1 of the first display panel 11 onto the reference plane is partially overlapped with the orthographic projection of the display region C1 of the third display panel 13 onto the reference plane, and the orthographic projection of the display region B1 of the second display panel 12 onto the reference plane is partially overlapped with the orthographic projection of the display region C1 of the third display panel 13 onto the reference plane is taken as an example. In some embodiments, the orthographic projection of the display region A1 of the first display panel 11 and/or the display region B1 of the second display panel 12 onto the reference plane may not be overlapped with the orthographic projection of the display region C1 of the third display panel 13 onto the reference plane. In this case, the display region C1 of the third display panel 13 may include complete pixel units, or, the sub-pixels in the third display panel 13 and the sub-pixels in the first display panel 11 and/or the second display panel 12 may constitute complete pixel units, which facilitates normal and complete display of the spliced display module.

Figure 2:
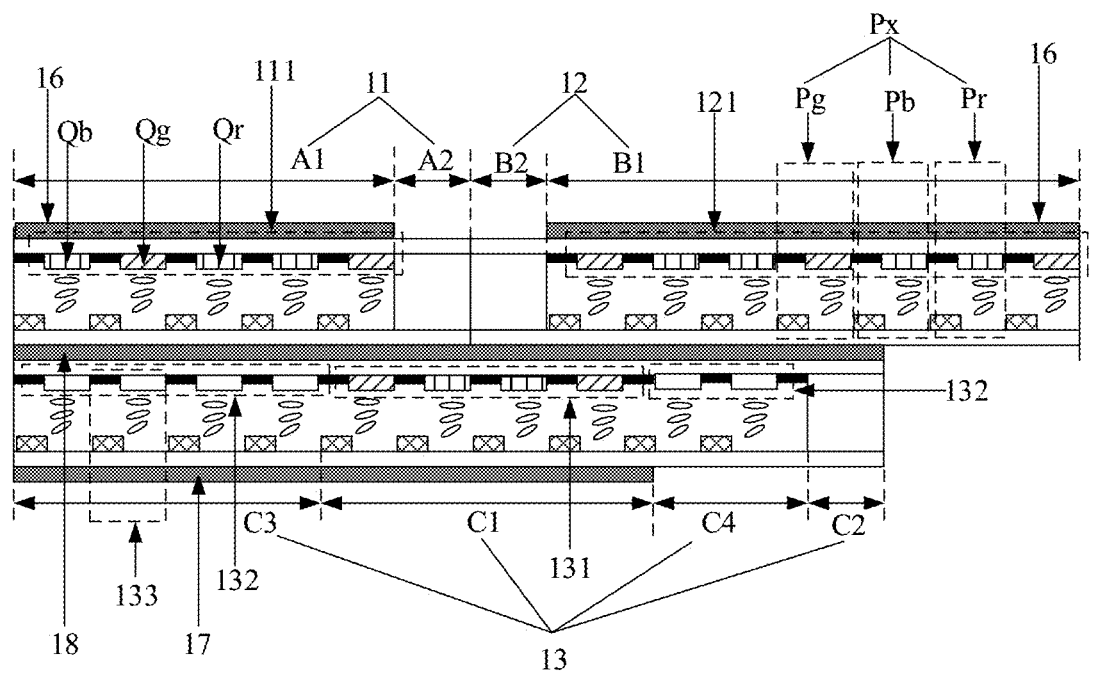
FIG. 2 is a schematic structural diagram of another display module according to an embodiment of the present disclosure.

In some embodiments, the third display panel 13 includes a dimming region, and the orthographic projection of the display region of at least one of the first display panel 1 and the second display panel 12 onto the reference plane is at least partially overlapped with an orthographic projection of the dimming region onto the reference plane. The dimming region allows light to transmit, and is configured to adjust light incident onto at least one of the first display panel 11 and the second display panel 12. For example, as shown in FIG. 1, the third display panel 13 includes the dimming region C3 disposed on a side of the display region C1, the orthographic projection of the display region A1 of the first display panel 11 onto the reference plane is at least partially overlapped with the orthographic projection of the dimming region C3 onto the reference plane, and the dimming region C3 is configured to adjust light incident onto the display region A1 of the first display panel 11. For example, as shown in FIG. 2, the third display panel 13 includes the dimming region C3 and a dimming region C4 that are disposed at two sides of the display region C1, the orthographic projection of the display region A1 of the first display panel 11 onto the reference plane is at least partially overlapped with the orthographic projection of the dimming region C3 onto the reference plane, and the orthographic projection of the display region B1 of the second display panel 12 onto the reference plane is at least partially overlapped with an orthographic projection of the dimming region C4 onto the reference plane. The dimming region C3 is configured to adjust light incident onto the display region A1 of the first display panel 11, and the dimming region C4 is configured to adjust light incident onto the display region B1 of the second display panel 12.

The display region and the dimming region in the third display panel 13 may be totally referred to as a panel functional region. The dimming region may include a plurality of dimming units 133, the plurality of dimming units 133 are in one-to-one correspondence to the plurality of sub-pixels in the first display panel 11 and/or the second display panel 12, and each of the dimming units 133 is configured to adjust light incident onto the corresponding sub-pixel. The dimming unit 133 and the sub-pixel may be of the same structure, and may be different in that the sub-pixel includes the color resistor block for filtering, and the dimming unit 133 includes a light transmitting block for transmitting light, or the dimming unit 133 may not include a light transmitting block. In some embodiments, the third display panel 13 includes an array substrate, a color film substrate, and a liquid crystal layer disposed between the array substrate and the color film substrate. The array substrate includes a thin-film transistor (TFT), a pixel electrode, and other structures. The color film substrate includes a black matrix (BM), a common electrode, the third color resistor array 131 disposed at the display region C1, a light transmitting array 132 disposed at the dimming region and other structures. The light transmitting array 132 and the third color resistor array 131 may be disposed in the same layer, and the light transmitting array 132 may be made of a transparent material. The light transmitting array 132 includes a plurality of light transmitting blocks. Each of the dimming units 133 in the third display panel 13 includes the TFT, the pixel electrode, the common electrode, the light transmitting block, and liquid crystals disposed between the light transmitting block and the array substrate. The TFT, the pixel electrode, the common electrode, and other structures in the dimming unit 133 are configured to drive the liquid crystals between the light transmitting block and the array substrate to deflect, so as to achieve dimming.

In the operation process of the display module according to the embodiments of the present application, light incident onto the first display panel 11 and/or the second display panel 12 may be adjusted by the dimming region of the third display panel 13 based on the luminance of the display region C1 of the third display panel 13, such that the luminance of the first display panel 11 and/or the second display panel 12 is consistent with the luminance of the display region C1 of the third display panel 13 (e.g., the luminance of a splicing region of the first display panel 11 and the second display panel 12). As the dimming units in the dimming region are in one-to-one correspondence to the sub-pixels in the first display panel 11 and/or the second display panel 12, the first display panel 11 and/or the second display panel 12 may be subjected to sub-pixel-level fine luminance adjustment by the dimming region, such that an image displayed by the display module is brighter in a bright portion and darker in a dark portion, can achieve an ultra-high contrast of 500,000:1, and is stronger in color expression and better in image quality.

Figure 3:
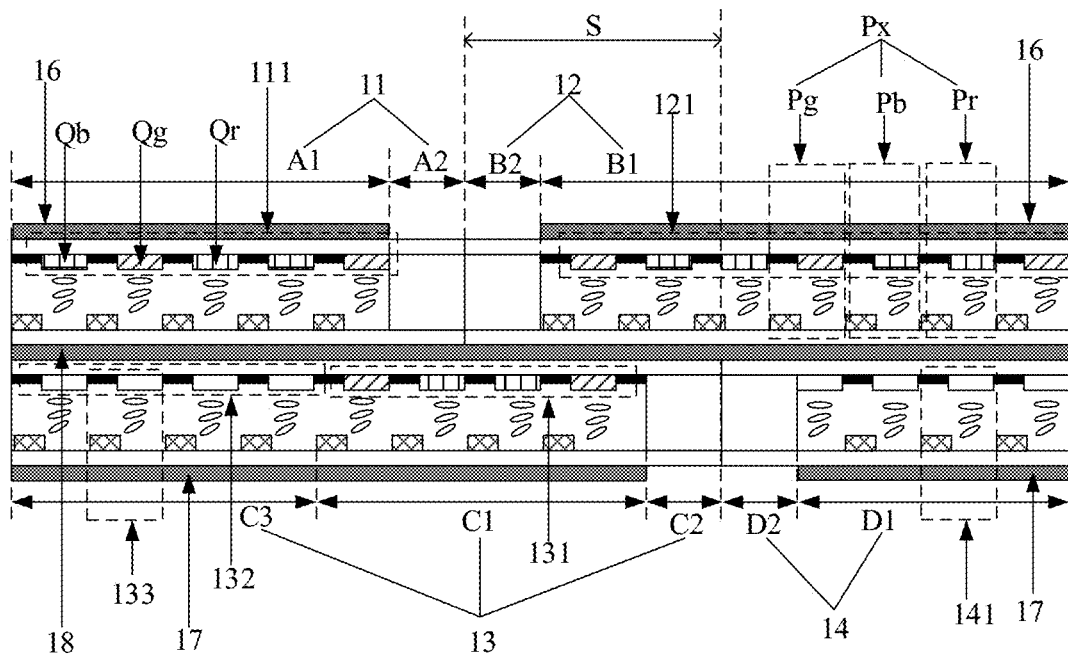
FIG. 3 is a schematic structural diagram of yet another display module according to an embodiment of the present disclosure.

In some embodiments, the third display panel 13 further includes a third edge sealing region C2 disposed at an edge of the third display panel 13, and the third edge sealing region C2 seals edges of the liquid crystals by the transparent frame sealant, and thus the third edge sealing region C2 is a transparent region. For example, as shown in FIG. 3, the display module further includes a dimming LCD panel 14. The dimming LCD panel 14 includes a dimming region D1 and a fourth edge sealing region D2, the fourth edge sealing region D2 is disposed at an edge of the dimming LCD panel 14, the dimming LCD panel 14 and the third display panel 13 are disposed in the same layer and spliced with each other, and the fourth edge sealing region D2 is abutted against the third edge sealing region C2. The fourth edge sealing region D2 seals edges of the liquid crystals by the transparent frame sealant, and thus the fourth edge sealing region D2 is a transparent region. The orthographic projection of the display region of at least one of the first display panel 11 and the second display panel 12 onto the reference plane is at least partially overlapped with an orthographic projection of the dimming region D1 of the dimming LCD panel 14 onto the reference plane. The dimming region D1 of the dimming LCD panel 14 is configured to adjust light incident onto the at least one display panel. For example, as shown in FIG. 3, the orthographic projection of the display region A1 of the first display panel 11 onto the reference plane is at least partially overlapped with the orthographic projection of the dimming region C3 of the third display panel 13 onto the reference plane, and the orthographic projection of the display region B1 of the second display panel 12 onto the reference plane is at least partially overlapped with the orthographic projection of the dimming region D2 of the dimming LCD panel 14 onto the reference plane. The dimming region C3 of the third display panel 13 is configured to adjust light incident onto the display region A1 of the first display panel 11, and the dimming region D2 of the dimming LCD panel 14 is configured to adjust light incident onto the display region 131 of the second display panel 12.

In some embodiments, the dimming region D2 of the dimming LCD panel 14 includes a plurality of dimming units 141, the plurality of dimming units 141 are in one-to-one correspondence to the plurality of sub-pixels in the first display panel 11 and; or the second display panel 12, and each of the dimming units 141 is configured to adjust light incident onto the corresponding sub-pixel, and the dimming unit 141 and the dimming unit 133 may be of the same structure. For example, the plurality of dimming units 141 are in one-to-one correspondence to the plurality of sub-pixels in the second display panel 12, and the light incident onto the second display panel 12 may be adjusted by controlling the liquid crystals in the dimming unit 141 to deflect, such that the second display panel 12 may be subjected to sub-pixel-level fine luminance adjustment. Therefore, an image displayed by the display module is brighter in a bright portion and darker in a dark portion, can achieve an ultra-high contrast, and is stronger in color expression and better in image quality.

In some embodiments, a splicing seam between the first display panel 11 and the second display panel 12 is a first splicing seam, and a splicing seam between the third display panel 13 and the dimming LCD panel 14 is a second splicing seam. The distance S between the first splicing seam and the second splicing seam may be 1 to 4 times of a pixel width, and the pixel width may be a width of the pixel unit in the first display panel 11, the second display panel 12, or the third display panel 13. The pixel unit in any one of the first display panel 11, the second display panel 12, and the third display panel 13 is composed of at least two adjacent sub-pixels. For example, the pixel unit in each of the first display panel 11, the second display panel 12, and the third display panel 13 is composed of a red sub-pixel, a green sub-pixel, and a blue sub-pixel that are adjacent to one another. FIG. 3 shows a case where the distance S between the first splicing seam and the second splicing seam is 1 time of the pixel width. The distance S between the first splicing seam and the second splicing seam is a staggered distance between the LCD panel in an upper layer and the LCD panel in a lower layer.

In the embodiments of the present disclosure, the first display panel 11, the second display panel 12, the third display panel 13, and the dimming LCD panel 14 may be LCD panels of the same size, and the first edge sealing region A2, the second edge sealing region B2, the third edge sealing region C2, and the fourth edge sealing region D2 may be of the same width. The first display panel 11, the second display panel 12, the third display panel 13, and the dimming LCD panel 14 are spliced and superimposed to form a double-screen display module. A structure formed by splicing the first display panel 11 and the second display panel 12 may be referred to as a color cell (a color film substrate in the upper layer & an array substrate in the upper layer), and a structure formed by splicing the third display panel 13 and the dimming LCD panel 14 may be referred to as a mono cell (a color film substrate in the lower layer & an array substrate in the lower layer). In the display module according to the embodiments of the present disclosure, the display region C1 of the third display panel 13 in the lower layer may supplement the display content of the splicing region of the first display panel 11 and the second display panel 12 in the upper layer, thereby solving the problem of the splicing seam of the spliced display panel. In addition, the third display panel 13 and the dimming LCD panel 14 in the lower layer may adjust light, such that the luminance of outgoing light of the first display panel 11 and the second display panel 12 in the upper layer and the luminance of outgoing light of the display region C1 of the third display panel 13 in the lower layer are equivalent, and the display effect of the double-screen display module is improved. Furthermore, as the distance S between the first splicing seam and the second splicing seam is 1 to 4 times of the pixel width, the display content of the display region C1 of the third display panel 13 can be prevented from adversely affecting the display contents of the first display panel 11 and the second display panel 12. As the distance S between the first splicing seam and the second splicing seam is 1 to 4 times of the pixel width, and the first display panel 11, the second display panel 12, the third display panel 13, and the dimming LCD panel 14 are of the same size, a staggered distance between edges of the color cell and the mono cell is further 1 to 4 times of the pixel width, and the color cell and the mono cell can shield light from each other, which helps to achieve a narrow frame of the display module.

In some embodiments, the distance S between the first splicing seam and the second spliced seam (i.e., the staggered distance between the LCD panel in the upper layer and the LCD panel in the lower layer) is greater than a sum of the width of the second edge sealing region B2 and the width of the fourth edge sealing region D2. For example, where both the width of the second edge sealing region B2 and the width of the fourth edge sealing region D2 are W, S is greater than 2 W. In this way, the orthographic projection of the first display panel 11 and/or the second display panel 12 onto the reference plane may cover the orthographic projections of the second edge sealing region B2 and the fourth edge sealing region D2 onto the reference plane, such that the regions of the display module corresponding to the second edge sealing region B2 and the fourth edge sealing region D2 (i.e., the splicing region of the third display panel 13 and the dimming LCD panel 14) may further display normally.

Figure 4:
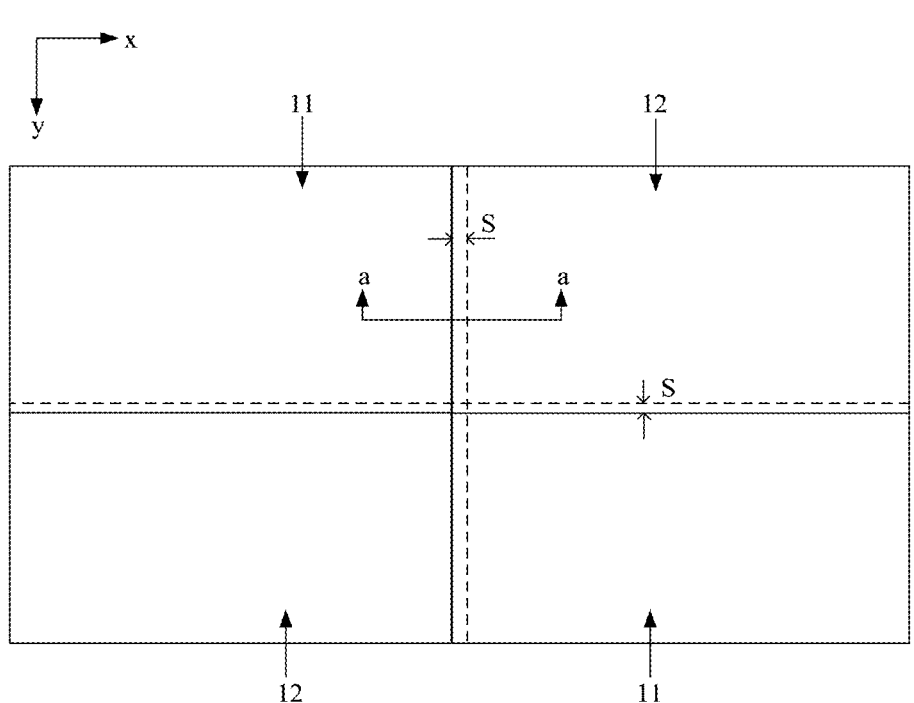
FIG. 4 is a front view of a display module according to an embodiment of the present disclosure.

In some embodiments, the pixel width of the display module formed by splicing the first display panel 11, the second display panel 12, the third display panel 13, and the dimming LCD panel 14 is about 0.5 mm, and a frame width of a spliced common narrow-frame product is about 2 mm. In actual production, the distance S between the first splicing seam and the second splicing seam may be 3 to 4 pixel widths (i.e., the distance S between the first splicing seam and the second splicing seam is 3 to 4 times of the pixel width), which can satisfy not only the demand for a narrow frame of the display module, but also the demands of process manufacture, and reduce the difficulty of fitting between the LCD panel in the upper layer and the LCD panel in the lower layer in the manufacture process. For example, referring to FIG. 4, which is a front view of a display module according to an embodiment of the present disclosure, the display module is formed by splicing two first display panels 11, two second display panels 12, two third display panels 13, and two dimming LCD panels 14, the two first display panels 11 and the two second display panels 12 are disposed in the upper layer, and the two third display panels 13 and the two dimming LCD panels 14 are disposed in the lower layer. The staggered distance S along an x axis direction may be set to be 4 times of the pixel width, and the staggered distance S along a y axis direction may be set to be 3 times of the pixel width. FIG. 3 may be a sectional view of a plane a-a in FIG. 4.

Figure 5:
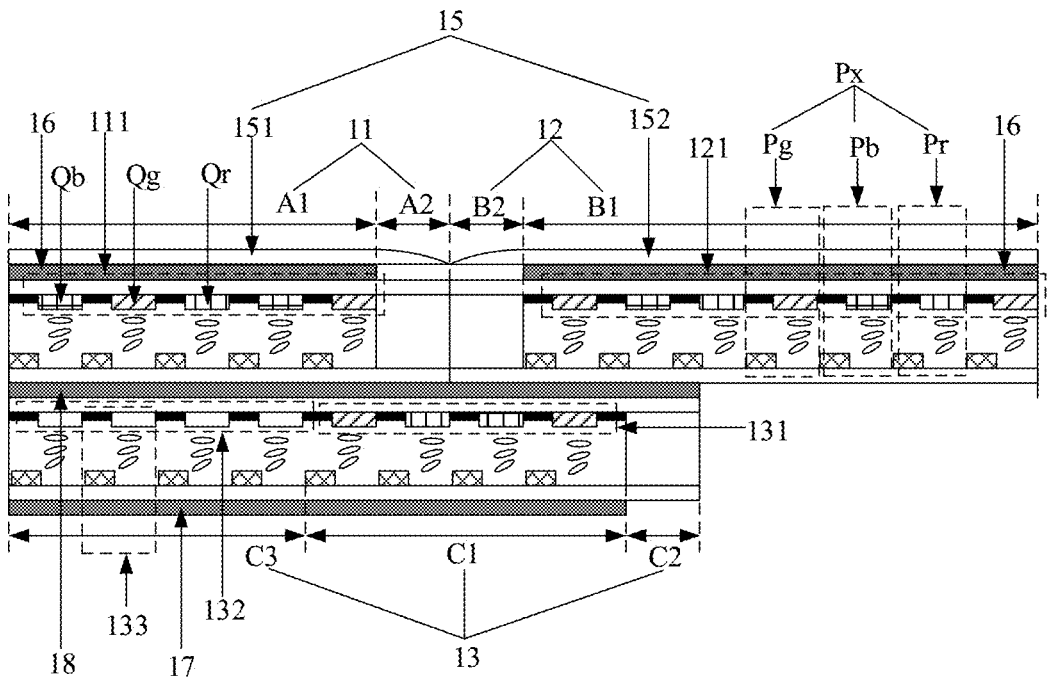
FIG. 5 is a schematic structural diagram of yet another display module according to an embodiment of the present disclosure.
Figure 6:
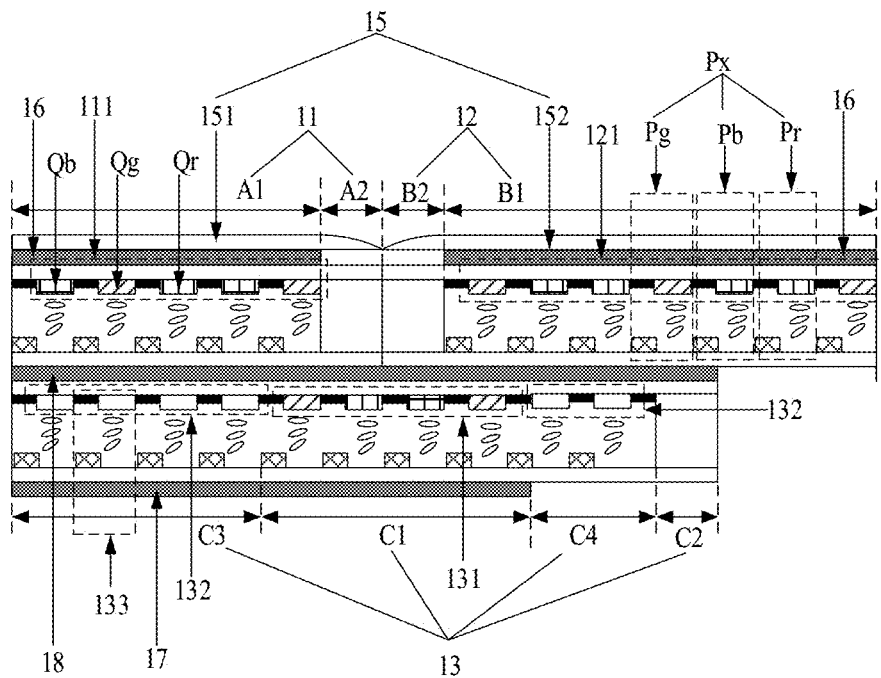
FIG. 6 is a schematic structural diagram of still yet another display module according to an embodiment of the present disclosure.
Figure 7:
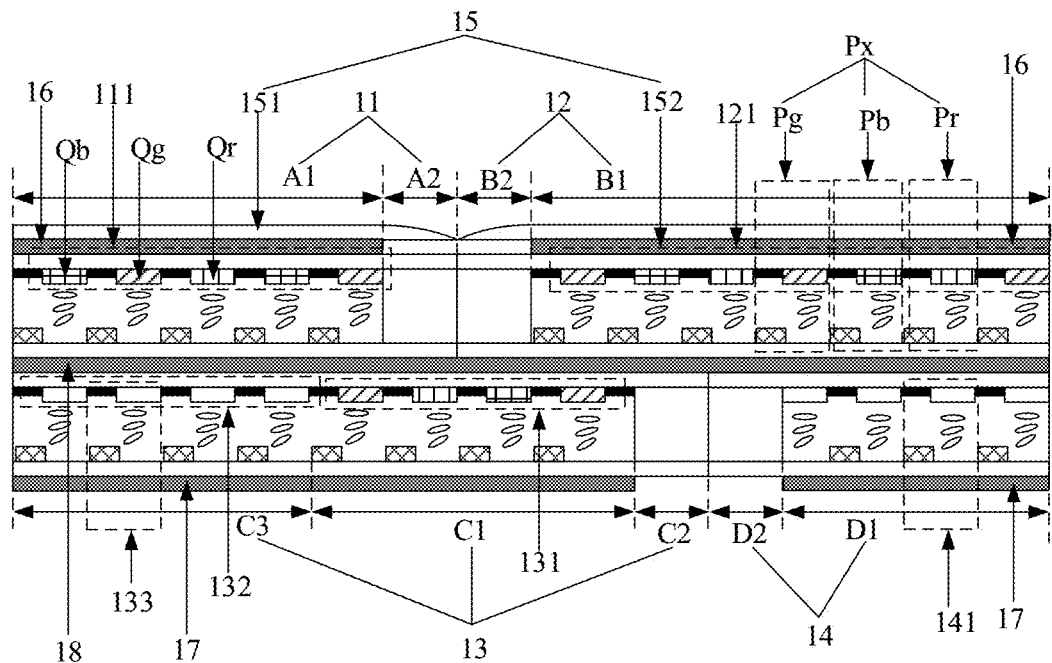
FIG. 7 is a schematic structural diagram of still yet another display module according to an embodiment of the present disclosure.

In some embodiments, as shown in FIGS. 5 to 7, the display module further includes a light adjusting layer 15. The light adjusting layer 15 is disposed on light-emitting sides of the first display panel 11 and the second display panel 12, and is configured to adjust the density of outgoing light of the first display panel 11 and the second display panel 12 to make the outgoing light of the first display panel 11 and the second display panel 12 more uniform. As in the first display panel 11 and the second display panel 12, the light transmittance of the edge sealing regions (including the first edge sealing region A2 and the second edge sealing region B2) is different from the light transmittance of the display regions (including the display region A1 and the display region B1), the luminance of the edge sealing regions is different from the luminance of the display regions. The light adjusting layer 15 is configured to adjust the uniformity of the outgoing light of the first display panel 11 and the second display panel 12, such that the different display regions of the display module may be uniform in luminance, and the display effect of the display module can be improved.

In some embodiments, the light adjusting layer 15 includes a first sub-adjusting layer 151 and a second sub-adjusting layer 152, both the first sub-adjusting layer 151 and the second sub-adjusting layer 152 may be made of 2.5D glass with high transparency. The 2.5D glass is glass of which an edge is provided with a curved portion, and the glass is acquired by performing arc processing on an edge of plain glass. The curved portion at the edge of the first sub-adjusting layer 151 and the curved portion at the edge of the second sub-adjusting layer 152 may refract light, such that outgoing light of the display region A1 of the first display panel 11, the display region B1 of the second display panel 12, the first edge sealing region A2 and the second edge sealing region B2 is more uniform, and the uniformity of brightness of a displayed picture is guaranteed.

In some embodiments, the first sub-adjusting layer 151 includes a first curved portion disposed on the light-emitting side of the first display panel 11, and an orthographic projection of the first curved portion onto the first display panel 11 covers the first edge sealing region A2. For example, the orthographic projection of the first curved portion onto the first display panel 11 overlaps with the first edge sealing region A2, The second sub-adjusting layer 151 includes a second curved portion disposed on the light-emitting side of the second display panel 12, and an orthographic projection of the second curved portion onto the second display panel 12 covers the second edge sealing region B2. In some embodiments, an orthographic projection of the second curved portion onto the third display panel 13 further covers the third edge sealing region C2, and an orthographic projection of the second curved portion onto the dimming LCD panel 14 further covers the fourth edge sealing region D2. For example, an orthographic projection of the second curved portion onto the reference plane overlaps with an orthographic projection of the second edge sealing region B2 onto the reference plane, an orthographic projection of the third edge sealing region C2 onto the reference plane, and an orthographic projection of the fourth edge sealing region D2 onto the reference plane.

Figure 8:
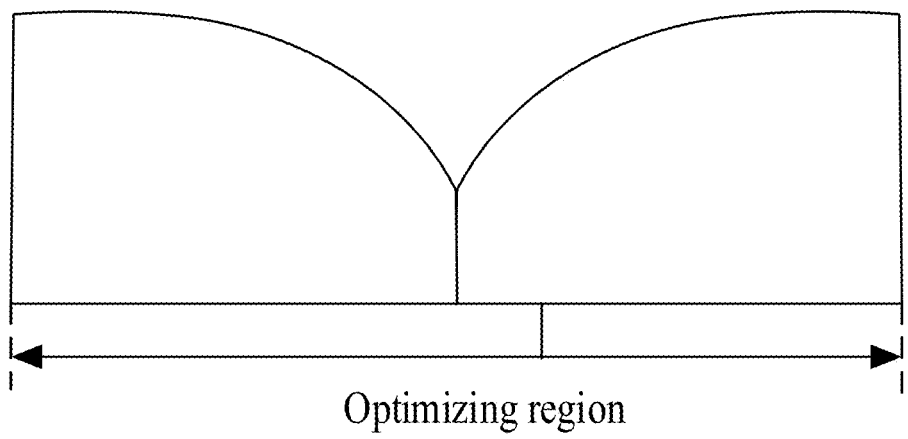
FIG. 8 is a schematic diagram of an optical model of a light adjusting layer according to an embodiment of the present disclosure.
Figure 9:
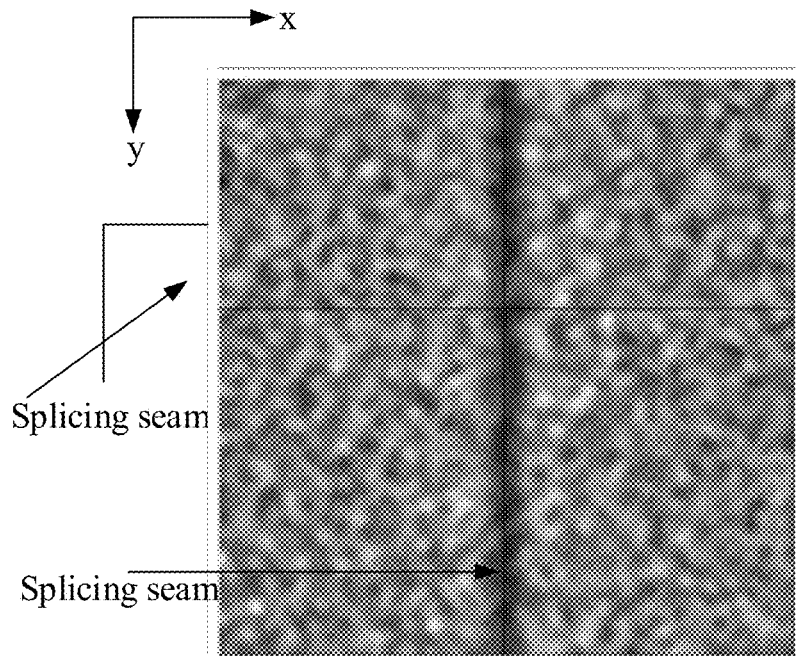
FIG. 9 is a schematic diagram showing luminance of a display module not provided with a light adjusting layer according to an embodiment of the present disclosure.
Figure 10:
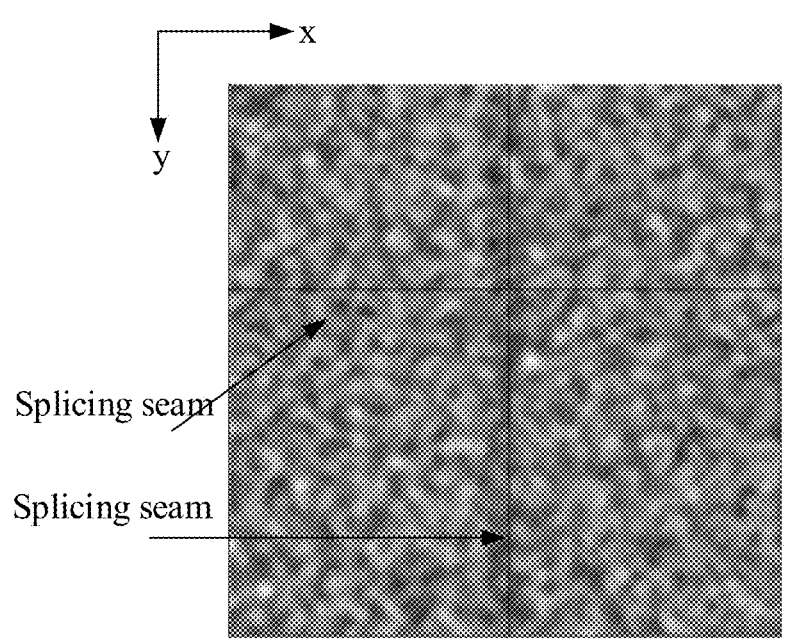
FIG. 10 is a schematic diagram showing luminance of a display module provided with a light adjusting layer according to an embodiment of the present disclosure.

In the embodiments of the present disclosure, a width of an optimizing region of the light adjusting layer 15 may be about 2.5 mm. The optimizing region of the light adjusting layer 15 refers to a region where the curved portion of the light adjusting layer 15 is disposed. As a width of a sealing region of a large-sized spliced display panel generally ranges from 0.2 to 0.4 mm, and the light adjusting layer 15 can achieve the uniformity of light density in the first edge sealing region A2, the second edge sealing region B2, the third edge sealing region C2, the fourth edge sealing region D2, and an S+2 W region, the width of the optimizing region of the light adjusting layer 15 is about 2.5 mm. Illustratively, FIG. 8 is a schematic diagram of an optical model of a light adjusting layer 15 according to an embodiment of the present disclosure. In FIG. 8, an explanation is made by taking that both of the first sub-adjusting layer 151 and the second sub-adjusting layer 152 in the light adjusting layer 15 are made of the 2.5D glass, and the width of the optimizing region of the light adjusting layer 15 is 2.5 mm as an example. FIG. 9 is a schematic diagram showing luminance of a display module not provided with a light adjusting layer 15, and FIG. 10 is a schematic diagram showing luminance of a display module provided with a light adjusting layer 15. As shown in FIG. 9, the luminance of the region where the splicing seam of the display module is disposed (i.e., the splicing region) is low, and the luminance of other display regions is high, and thus the display module is poor in uniformity of luminance. As shown in FIG. 10, the luminance of the region where the splicing seam of the display module is disposed (i.e., the splicing region) and other display regions is high, and thus the display module is relatively uniform in luminance. It can be seen that the display module including the light adjusting layer 15 is more uniform in luminance, and the display brightness of the display module is better in uniformity.

In some embodiments, continuously referring to FIGS. 1 to 3 and 5 to 7, the display module further includes a first polarizer 16, a second polarizer 17, and a third polarizer 18. The first polarizer 16 is disposed on the light-emitting sides of the first display panel 11 and the second display panel 12, and is provided with a first opening K1. An orthographic projection of the first opening K1 onto the reference plane covers the orthographic projection of the first edge sealing region A2 onto the reference plane and the orthographic projection of the second edge sealing region B2 onto the reference plane. For example, the orthographic projection of the first opening K1 onto the reference plane overlaps with the orthographic projections of the first edge sealing region A2 and the second edge sealing region B2 onto the reference plane. The first opening K1 may be sealed by a frame sealant. The second polarizer 17 is disposed on the backlight sides of the third display panel 13 and the dimming LCD panel 14, and is provided with a second opening K2. An orthographic projection of the second opening K2 onto the reference plane covers the orthographic projection of the third edge sealing region C2 onto the reference plane and the orthographic projection of the fourth edge sealing region D2 onto the reference plane. For example, the orthographic projection of the second opening K2 onto the reference plane overlaps with the orthographic projections of the third edge sealing region C2 and the fourth edge sealing region D2 onto the reference plane. The second opening K2 may be sealed by the frame sealant. The third polarizer 18 is disposed on the backlight sides of the first display panel 11 and the second display panel 12, and is disposed on the light-emitting sides of the third display panel 13 and the dimming LCD panel 14. That is, the third polarizer 18, as a polarizer shared by the LCD panel in the upper layer and the LCD panel in the lower layer, is disposed between the LCD panel in the upper layer and the LCD panel in the lower layer. A polarization axis direction of the first polarizer 16 is parallel to a polarization axis direction of the second polarizer 17, and is perpendicular to a polarization axis direction of the third polarizer 18. The first display panel 11 and the second display panel 12 achieves display by the first polarizer 16, the third polarizer 18, and the liquid crystal layers, the color film substrates and the array substrates in both the first display panel 11 and the second display panel 12. The display region C1 achieves display by the second polarizer 17, the third polarizer 18, and the display region C1 in the third display panel 13. The light incident onto the first display panel 11 and the second display panel 12 is adjusted by the second polarizer 17, the third polarizer 18, the dimming region in the third display panel 13 and the dimming LCD panel 14. As shown in FIGS. 5 to 7, the light adjusting layer 15 is disposed on the side, distal from the first display panel 11 and the second display panel 12, of the first polarizer 16. That is, the first polarizer 16 and the light adjusting layer 15 are sequentially laminated on the light-emitting sides of the first display panel H and the second display panel 12.

In some embodiments, the distance between the splicing seam (i.e., the first splicing seam) between the first display panel 11 and the second display panel 12 and a side wall of the first opening K1 is greater than or equal to the width of the first edge sealing region A2. As the width of the first edge sealing region A2 is equal to the width of the second edge sealing region B2, the distance between the first splicing seam and the side wall of the first opening K1 is also greater than or equal to the width of the second edge sealing region B2. For example, the distance between the center line of the first splicing seam and the side wall of the first opening K1 is greater than or equal to the width of the first edge sealing region A2. As the distance between the first splicing seam and the side wall of the first opening K1 is greater than or equal to the width of the first edge sealing region A2, the outgoing light from the display region C1 of the third display panel 13 may be transmitted through the first edge sealing region A2 and the second edge sealing region B2 after passing through the third polarizer, without being adjusted by the first polarizer 16.

In some embodiments, each of the first display panel 11, the second display panel 12, the third display panel 13, and the dimming LCD panel 14 includes a bonding side and a non-bonding side. For example, the bonding side may be a chip on film (COF) bonding side or a gate on array (GOA) bonding side. The first edge sealing region A2 may be disposed on the non-bonding side of the first display panel 11, the second edge sealing region B2 may be disposed on the non-bonding side of the second display panel 12, the third edge sealing region C2 may be disposed on the non-bonding side of the third display panel 13, and the fourth edge sealing region D2 may be disposed on the non-bonding side of the dimming LCD panel 14. That is, the non-bonding side of the first display panel 11 is spliced with the non-bonding side of the second display panel 12, and the non-bonding side of the third display panel 13 is spliced with the non-bonding side of the dimming LCD panel 14, thereby avoiding adversely affecting bonding between the LCD panels and a circuit board due to splicing of the different LCD panels.

In the embodiments of the present disclosure, the LCD panels in the upper layer (including the first display panel 11 and the second display panel 12) and the LCD panels in the lower layer (including the third display panel 13 and the dimming LCD panel 14) may be bonded in a staggered manner by the precision bonding technology. Display detects of the splicing region of the first display panel 11 and the second display panel 12 that are disposed in the upper layer may be compensated by the display region C1 of the third display panel 13 in the lower layer. The first display panel 11, the second display panel 12, and the third display panel 13 cooperate to display pictures, which helps to ensure normal display of the splicing region of the first display panel 11 and the second display panel 12, such that that the display module may achieve complete and seamless display. The display module according to the present disclosure may be an LCD spliced screen. Compared with the LED spliced screen, the LCD spliced screen is higher in yield, lower in cost and stronger in universality. In addition, the displayed picture of the LCD spliced screen may not be subject to defects such as rainbow patterns and moire patterns.

Based on the same inventive concept, an embodiment of the present disclosure further provides a display device, including the display module as defined in any one of the above embodiments. The display device has the effects of the display module as defined in any one of the above embodiments, which is not repeated herein.

Figure 11:
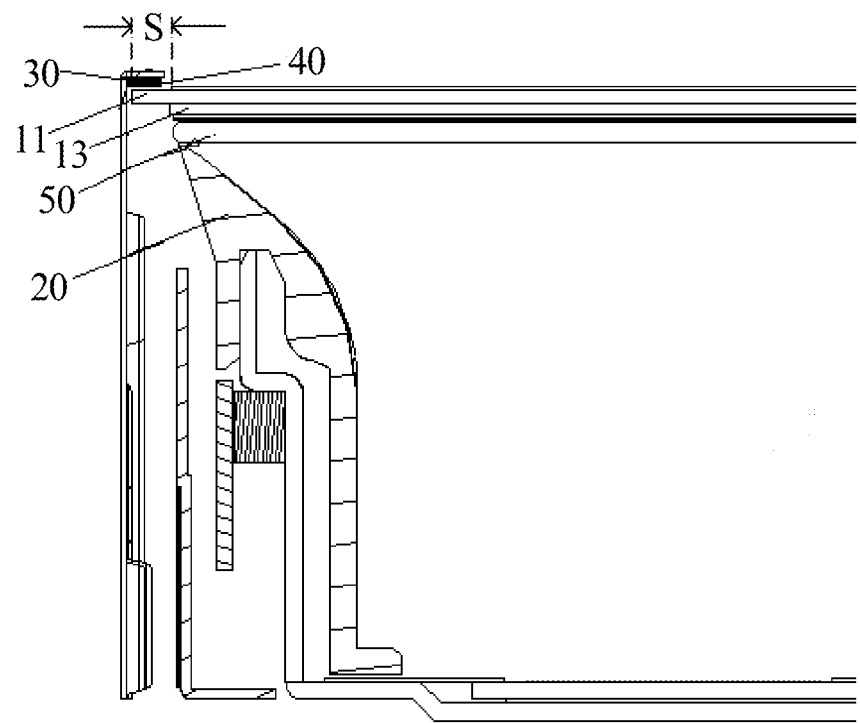
FIG. 11 is a schematic structural diagram of a display device according to an embodiment of the present disclosure.

In some embodiments, referring to FIG. 11, which is a schematic structural diagram of a display device according to an embodiment of the present disclosure, the display device further includes a backlight module 20 disposed on a side, distal from the first display panel 11 and the second display panel 12, of the third display panel 13. The backlight module 20 may provide light for the first display panel 11, the second display panel 12, and the third display panel 13.

In some embodiments, the display device further includes a front frame 30 and a light-shielding foam 40. The front frame 30 includes a front frame bending portion parallel to the first display panel 11, and the front frame bending portion may be made of a black baking varnish material. The light-shielding foam 40 may be a soft black foam with a high compression ratio, and is disposed between the front frame bending portion and the first display panel 11. For example, the light-shielding foam 40 is filled in a gap between the front frame bending portion and the first display panel 11, and the light-shielding foam 40 may prevent light emitted by the backlight module 20 from exiting through the gap between the front frame bending portion and the first display panel 11, thus avoiding light leakage of an edge of the display device.

In some embodiments, the width of the front frame bending portion is greater than or equal to the distance S between the first splicing seam and the second splicing seam, such that the edge of the display device can be prevented from light leakage caused due to misplacement.

Figure 12:
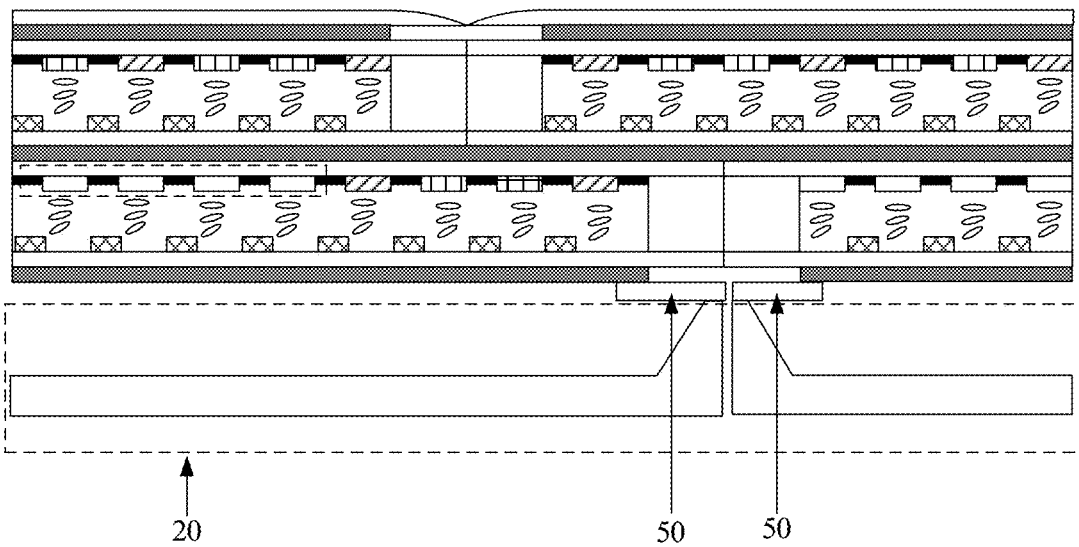
FIG. 12 is a schematic structural diagram of another display device according to an embodiment of the present disclosure.

In some embodiments, referring to FIG. 12, which is a schematic structural diagram of another display device according to an embodiment of the present disclosure, the backlight module 20 is made of aluminum. An inclined plane is formed in a region of the backlight module 20 corresponding to a splicing region of the display module (for example, a region corresponding to the third edge sealing region C2 and/or the fourth edge sealing region D2), and a diffusion plate 50 is attached on the region. The diffusion plate 50 may diffuse light emitted by the inclined plane of the backlight module 20 to ensure the light transmittance of the splicing region.

The above descriptions are introductions of the display module and display device provided in the present disclosure, and a method for manufacturing a display module is introduced hereinafter. The method and principle of manufacturing the display module may be referred to the descriptions in the following embodiments.

Figure 13:
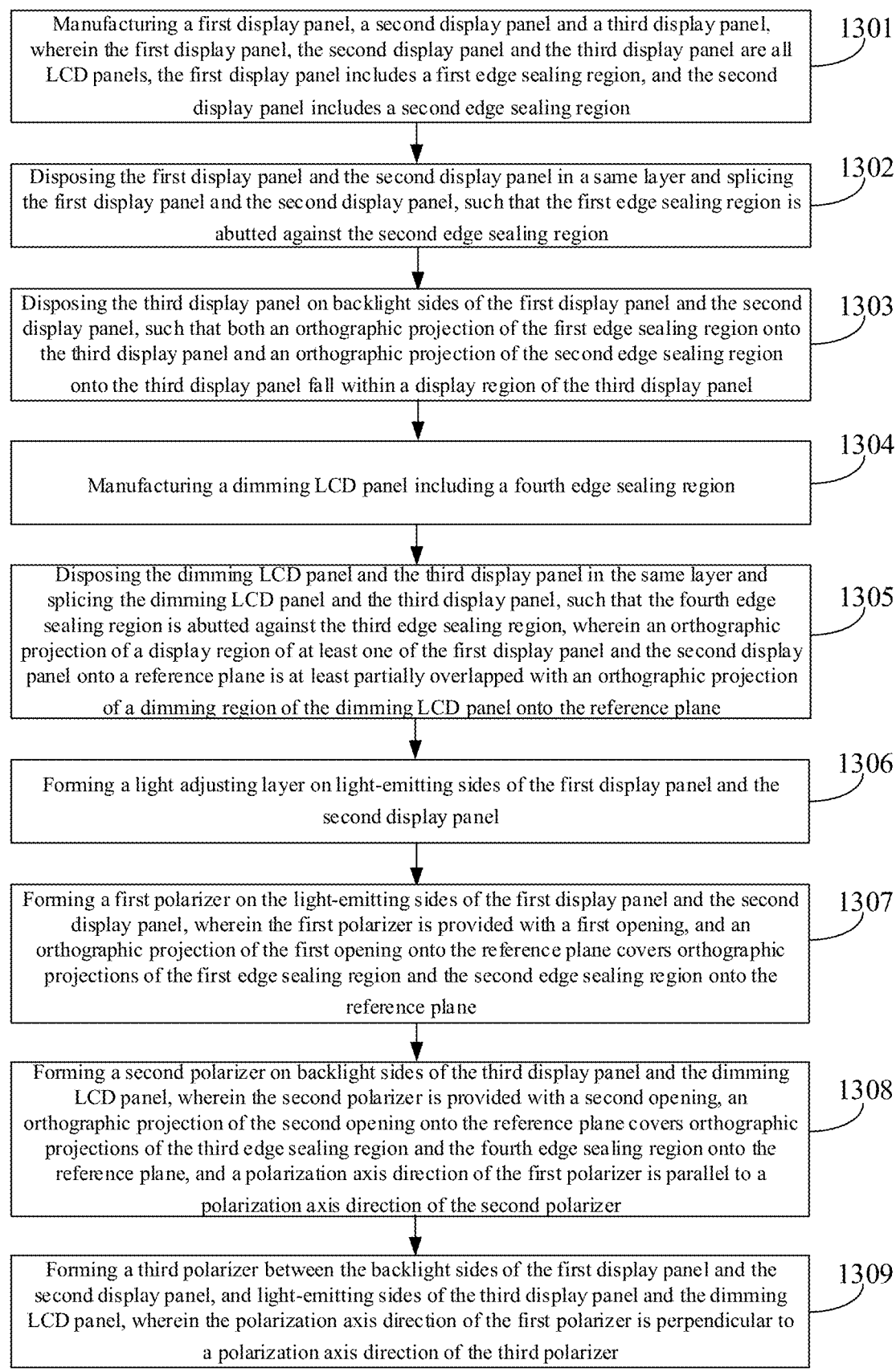
FIG. 13 is a flowchart of a method for manufacturing a display module according to an embodiment of the present disclosure.

FIG. 13 is a flowchart of a method for manufacturing a display module according to an embodiment of the present disclosure. The method is used for manufacturing the display module as defined in the foregoing embodiment As shown in FIG. 13, the method includes the following processes.

In S1301, a first display panel, a second display panel, and a third display panel are manufactured. The first display panel, the second display panel, and the third display panel are all LCD panels, the first display panel includes a first edge sealing region, and the second display panel includes a second edge sealing region.

Each of the first display panel, the second display panel, and the third display panel includes a display region, and the third display panel may further include a third edge sealing region and a dimming region. Each of the first display panel, the second display panel, and the third display panel includes an array substrate, a color film substrate, and a liquid crystal layer disposed between the array substrate and the color film substrate.

In some embodiments, manufacturing the first display panel includes: manufacturing the array substrate and the color film substrate; providing an encapsulation adhesive in a peripheral region of the array substrate or the color film substrate; disposing the array substrate and the color film substrate opposite to each other, such that the array substrate and the color film substrate are bonded by the encapsulation adhesive and hence a liquid crystal layer is disposed in a space surrounded by the array substrate, the color film substrate and the encapsulation adhesive; and acquiring a first display panel. A region of the first display panel corresponding to the encapsulation adhesive includes the first edge sealing region.

Reference may be made to the process of manufacturing the first display panel for processes of manufacturing the second display panel and the third display panel, which are not repeated herein. Different from the first display panel and the second display panel, a light transmitting block is disposed in the dimming region of the third display panel. During the manufacture of the color film substrate of the third display panel, a transparent material may be used to form the light transmitting block in the dimming region of the color film substrate.

In S1302, the first display panel and the second display panel are disposed in the same layer and spliced with each other, such that the first edge sealing region is abutted against the second edge sealing region.

In some embodiments, both a side surface of the first edge sealing region of the first display panel and a side surface of the second edge sealing region of the second display panel are spray-coated with a transparent protective adhesive, and the side surface of the first edge sealing region and the side surface of the second edge sealing region are bonded by the transparent protective adhesive, such that the first edge sealing region is abutted against the second edge sealing region, the first display panel and the second display panel are disposed in the same layer, and a display surface of the first display panel and a display surface of the second display panel are disposed on the same side.

In S1303, the third display panel is disposed on backlight sides of the first display panel and the second display panel, such that both an orthographic projection of the first edge sealing region onto the third display panel and an orthographic projection of the second edge sealing region onto the third display panel fall within a display region of the third display panel.

In some embodiments, the third display panel is attached to the backlight sides of the first display panel and the second display panel by the precision bonding technology, such that the display surface of the third display panel faces towards the first display panel and the second display panel, and the orthographic projection of the first edge sealing region onto the third display panel and the orthographic projection of the second edge sealing region onto the third display panel fall within the display region of the third display panel.

In some embodiments, the third display panel includes a dimming region. After the third display panel is disposed on the backlight sides of the first display panel and the second display panel, an orthographic projection of a display region of at least one of the first display panel and the second display panel onto a reference plane is at least partially overlapped with an orthographic projection of the dimming region onto the reference plane. For example, as shown in FIG. 1, the orthographic projection of the display region A1 of the first display panel 11 onto the reference plane is at least partially overlapped with the orthographic projection of the dimming region C3 onto the reference plane. For example, as shown in FIG. 2, the orthographic projection of the display region A1 of the first display panel 11 onto the reference plane is at least partially overlapped with the orthographic projection of the dimming region C3 onto the reference plane, and the orthographic projection of the display region B1 of the second display panel 13 onto the reference plane is at least partially overlapped with the orthographic projection of the dimming region C4 onto the reference plane.

In some embodiments, the third display panel includes the third edge sealing region, and the method further includes S1304 to S1305.

In 1304, a dimming LCD panel is manufactured, wherein the dimming LCD panel includes a fourth edge sealing region.

The process of manufacturing the dimming LCD panel may be referred to the process of manufacturing the first display panel, which is not repeated herein. Different from the first display panel, during the manufacture of a color film substrate of the dimming LCD panel, a transparent material may be used to form a light transmitting block in the color film substrate.

In S1305, the dimming LCD panel and the third display panel are disposed in the same layer and spliced with each other, such that the fourth edge sealing region is abutted against the third edge sealing region. The orthographic projection of the display region of at least one of the first display panel and the second display panel onto the reference plane is at least partially overlapped with the orthographic projection of the dimming region of the dimming LCD panel onto the reference plane.

In some embodiments, each of the side surface of the third edge sealing region of the third display panel and the side surface of the fourth edge sealing region of the dimming LCD panel is spray-coated with the transparent protective adhesive, and the side surface of the third edge sealing region and the side surface of the fourth edge sealing region are bonded by the transparent protective adhesive, such that the third edge sealing region is abutted against the fourth edge sealing region. The third display panel and the dimming LCD panel are disposed in the same layer, and the orthographic projection of the display region of at least one of the first display panel and the second display panel onto the reference plane is at least partially overlapped with the orthographic projection of the dimming region of the dimming LCD panel onto the reference plane. For example, as shown in FIG. 3, the orthographic projection of the display region B2 of the second display panel 12 onto the reference plane is at least partially overlapped with the orthographic projection of the dimming region D1 of the dimming LCD panel 14 onto the reference plane.

In the embodiments of the present disclosure, S1305 may be performed upon S1303. That is, the third display panel is disposed on the backlight sides of the first display panel and the second display panel first, and then, the dimming LCD panel and the third display panel are spliced with each other. In some embodiments, S1303 and S1205 may be merged. For example, an LCD panel in the lower layer may be acquired by splicing the third display panel with the dimming LCD panel (referring to S1302 for the implementation process), and then the LCD panel in the lower layer and an LCD panel (composed of the first display panel and the second display panel that are spliced with each other) in the upper layer are fitted in a staggered manner by the precise bonding technology, which are not limited in the embodiments of the present disclosure.

In some embodiments, the method further includes S1306.

In S1306, a light adjusting layer is formed on light-emitting sides of the first display panel and the second display panel.

The light adjusting layer may include the first sub-adjusting layer and the second sub-adjusting layer, both of the first sub-adjusting layer and the second sub-adjusting layer may be made of 2.5D glass with high transparency. In some embodiments, S1306 includes: forming the first sub-adjusting layer on the light-emitting side of the first display panel, wherein the first sub-adjusting layer includes a first curved portion, and an orthographic projection of the first curved portion onto the first display panel covers the first edge sealing region; forming the second sub-adjusting layer on the light-emitting side of the second display panel, wherein the second sub-adjusting layer includes a second curved portion, and an orthographic projection of the second curved portion onto the second display panel covers the second edge sealing region. For example, the first sub-adjusting layer is attached to a light-emitting surface of the first display panel, and the second sub-adjusting layer is attached to a light-emitting surface of the second display panel.

In some embodiments, the method further includes S1307 to S1309.

In S1307, a first polarizer is formed on the light-emitting sides of the first display panel and the second display panel, and is provided with a first opening, wherein an orthographic projection of the first opening onto the reference plane covers orthographic projections of the first edge sealing region and the second edge sealing region onto the reference plane.

In some embodiments, the first polarizer is attached to the light-emitting surfaces of the first display panel and the second display panel, such that the orthographic projection of the first opening of the first polarizer onto the reference plane covers the orthographic projections of the first edge sealing region and the second edge sealing region onto the reference plane. In some embodiments, S1307 may be performed prior to S1306. That is, the first polarizer is attached to the light-emitting surfaces of the first display panel and the second display panel first, and then the light adjusting layer is attached to the side, distal from both of the first display panel and the second display panel, of the first polarizer.

In S1308, a second polarizer is formed on backlight sides of the third display panel and the dimming LCD panel, and is provided with a second opening, wherein an orthographic projection of the second opening onto the reference plane covers orthographic projections of the third edge sealing region and the fourth edge sealing region onto the reference plane, and a polarization axis direction of the first polarizer is parallel to a polarization axis direction of the second polarizer.

In some embodiments, the second polarizer is attached to backlight surfaces of the third display panel and the dimming LCD panel.

In S1309, a third polarizer is formed between the backlight sides of the first display panel and the second display panel, and light-emitting sides of the third display panel and the dimming LCD panel, wherein the polarization axis direction of the first polarizer is perpendicular to a polarization axis direction of the third polarizer.

In some embodiments, the third polarizer is attached to the backlight surfaces of the first display panel and the second display panel, or the third polarizer is attached to the light-emitting surfaces of the third display panel and the dimming LCD panel. S1309 may be performed prior to S1303 or S1305. For example, prior to fitting the LCD panel in the lower layer and the LCD panel in the lower layer in a staggered manner, the third polarizer is attached to the backlight surface of the LCD panel in the lower layer, or the third polarizer is attached to the light-emitting surfaces of the third display panel and the dimming LCD panel.

In summary, in the display module manufactured by the method according to the embodiments of the present disclosure, as the first display panel and the second display panel are disposed in the same layer and spliced with each other, the first edge sealing region of the first display panel is abutted against the second edge sealing region of the second display panel, the third display panel is disposed on the backlight sides of the first display panel and the second display panel, and the orthographic projection of the first edge sealing region onto the third display panel and the orthographic projection of the second edge sealing region onto the third display panel fall within the display region of the third display panel, the display region of the third display panel may compensate the first edge sealing region and the second edge sealing region, and the display content of the third display panel may compensate the display content of the first display panel and the display content of the second display panel, such that the display content of the display module is complete and seamless. The display module according to the present disclosure may be an LCD spliced screen. Compared with an LED spliced screen, the LCD spliced screen is higher in yield, lower in cost and stronger in universality. In addition, a displayed picture of the LCD spliced screen may not generate defects such as rainbow patterns and moire patterns.

In the method for manufacturing a display module according to the embodiments of the present disclosure, the sequence of the processes may be adjusted appropriately, and the processes may be deleted or added according to the situation. Any variations of the method easily derived by persons of ordinary skill in the art and within the technical scope disclosed by the present disclosure shall fall within the protection scope of the present disclosure.

In the present disclosure, the term "and/or" merely describes an association relationship between associated objects and indicates that there may be three relationships. For example, A and/or B may indicate that there are three cases where A exists alone, A and B exist simultaneously, and B exists alone. In addition, the character "/" in the text generally indicates that an "or" relationship exists between contextual objects. The term "at least one" means one or more, and "a plurality of" means two or more, unless otherwise specifically indicated.

Persons of ordinary skill in the art should understand that the discussion of any of the above embodiments is merely for an exemplary purpose, and is not intended to imply that the scope of the present disclosure (including the claims) is limited to these examples. Under the concept of the present disclosure, the above embodiments or the technical features in different embodiments may further be combined. Moreover, many other variations in different aspects of the embodiments as described above are possible but not provided in the detail for the sake of brevity.

In addition, the devices may be illustrated in the form of block diagrams in order not to obscure the embodiments of the present disclosure, and the consideration is also given to the fact that the details about the embodiments of the devices in these block diagrams are highly dependent on the platform on which the present disclosure is implemented (i.e., these details should be fully within the understanding of those skilled in the art). In the case where the specific details (for example, the circuits) are set forth to describe the exemplary embodiments of the present disclosure, it is obvious to those skilled in the art that the embodiments of the present disclosure may be implemented without these specific details or with these specific details changed. Therefore, these descriptions should be considered illustrative rather than limiting.

Although the present disclosure has been described in combination with the specific embodiments of the present disclosure, many substitutions, modifications, and variations of these embodiments are apparent to those of ordinary skill in the art based on the foregoing description. The embodiments of the present disclosure are intended to cover all such substitutions, modifications, and variations that fall within the broad scope of the appended claims. Therefore, any omission, modification, equivalent substitution, improvement and the like made within the spirit and principle of the present disclosure shall be construed as being included in the protection scope of the present disclosure.

What is claimed is:

1. A display module, comprising:
    a first display panel comprising a first edge sealing region;
    a second display panel comprising a second edge sealing region, wherein the second display panel and the first display panel are disposed in a same layer and spliced with each other, and the second edge sealing region is abutted against the first edge sealing region;
    a third display panel comprising a third edge sealing region, wherein the third display panel is disposed on backlight sides of the first display panel and the second display panel, wherein both an orthographic projection of the first edge sealing region onto the third display panel and an orthographic projection of the second edge sealing region onto the third display panel fall within a display region of the third display panel;
    a dimming LCD panel comprising a fourth edge sealing region, wherein the dimming LCD panel and the third display panel are disposed in a same layer and spliced with each other, and the fourth edge sealing region is abutted against the third edge sealing region;
    a first polarizer disposed on light-emitting sides of the first display panel and the second display panel, and provided with a first opening, wherein an orthographic projection of the first opening onto the reference plane covers orthographic projections of the first edge sealing region and the second edge sealing region onto the reference plane;
    a second polarizer disposed on backlight sides of the third display panel and the dimming LCD panel, and provided with a second opening, wherein an orthographic projection of the second opening onto the reference plane covers orthographic projections of the third edge sealing region and the fourth edge sealing region onto the reference plane; and
    a third polarizer disposed on the backlight sides of the first display panel and the second display panel, and disposed on the light-emitting sides of the third display panel and the dimming LCD panel;
    wherein the first display panel, the second display panel, and the third display panel are all liquid-crystal display (LCD) panels; an orthographic projection of a display region of at least one of the first display panel and the second display panel onto a reference plane is at least partially overlapped with an orthographic projection of a dimming region of the dimming LCD panel onto the reference plane, wherein the reference plane is parallel to a display surface of the display module; and a direction of a polarization axis of the first polarizer is parallel to a direction of a polarization axis of the second polarizer, and is perpendicular to a direction of a polarization axis of the third polarizer.

2. The display module according to claim 1, wherein
    a plurality of sub-pixels are disposed in a display region of the first display panel, a display region of the second display panel, and the display region of the third display panel;
    an orthographic projection of the display region of the first display panel onto a reference plane is partially overlapped with an orthographic projection of the display region of the third display panel onto the reference plane, and sub-pixels with overlapped orthographic projections in the first display panel and the third display panel are of a same color; and
    an orthographic projection of the display region of the second display panel onto the reference plane is partially overlapped with the orthographic projection of the display region of the third display panel onto the reference plane, and sub-pixels with overlapped orthographic projections in the second display panel and the third display panel are of a same color;
    wherein the reference plane is parallel to a display surface of the display module.

3. The display module according to claim 1, wherein
    the third display panel comprises a dimming region; and
    an orthographic projection of a display region of at least one of the first display panel and the second display panel onto a reference plane is at least partially overlapped with an orthographic projection of the dimming region onto the reference plane, wherein the reference plane is parallel to a display surface of the display module;
    wherein the dimming region is configured to adjust light incident onto the at least one display panel.

4. The display module according to claim 3, wherein
    a plurality of sub-pixels are disposed in both the display region of the first display panel and the display region of the second display panel, and a plurality of dimming units are disposed in the dimming region, wherein the plurality of dimming units are in one-to-one correspondence to the plurality of sub-pixels in the at least one display panel; and
    each of the dimming units is configured to adjust light incident onto the corresponding sub-pixel.

5. The display module according to claim 1, wherein
    a plurality of sub-pixels are disposed in both the display region of the first display panel and the display region of the second display panel, and the dimming LCD panel comprises a plurality of dimming units, wherein the plurality of dimming units are in one-to-one correspondence to the plurality of sub-pixels in the at least one display panel, and each of the plurality of dimming units is configured to adjust light incident onto the corresponding sub-pixel.

6. The display module according to claim 1, wherein
    a splicing seam between the first display panel and the second display panel is a first splicing seam; and
    a splicing seam between the third display panel and the dimming LCD panel is a second splicing seam; wherein
    a distance between the first splicing seam and the second splicing seam is 1 to 4 times of a pixel width;
    wherein the pixel width is a width of the pixel unit in the first display panel, the second display panel, or the third display panel, and the pixel unit in any one of the first display panel, the second display panel, and the third display panel is composed of at least two adjacent sub-pixels.

7. The display module according to claim 1, further comprising:
- a light adjusting layer disposed on light-emitting sides of the first display panel and the second display panel, and configured to adjust uniformity of outgoing light of the first display panel and the second display panel.

8. The display module according to claim 7, wherein the light adjusting layer comprises:
- a first sub-adjusting layer comprising a first curved portion, and disposed on the light-emitting side of the first display panel, wherein an orthographic projection of the first curved portion onto the first display panel covers the first edge sealing region; and
- a second sub-adjusting layer comprising a second curved portion, and disposed on the light-emitting side of the second display panel, wherein an orthographic projection of the second curved portion onto the second display panel covers the second edge sealing region.

9. The display module according to claim 1, wherein
- a plurality of sub-pixels are disposed in a display region of the first display panel, a display region of the second display panel, and the display region of the third display panel; wherein an orthographic projection of the display region of the first display panel onto a reference plane is partially overlapped with an orthographic projection of the display region of the third display panel onto the reference plane; an orthographic projection of the display region of the second display panel onto the reference plane is partially overlapped with the orthographic projection of the display region of the third display panel onto the reference plane; and the sub-pixels in the irst display panel and the third display panel, and sub-pixels with overlapped orthographic projections in the second display panel and the third display panel are of a same color; and the reference plane is parallel to a display surface of the display module;
- the third display panel comprises a dimming region, and the third display panel comprises a third edge sealing region; and
- the display module further comprises:
  - a dimming LCD panel comprising a fourth edge sealing region, wherein the dimming LCD panel and the third display panel are disposed in a same layer and spliced with each other, and the fourth edge sealing region is abutted against the third edge sealing region; wherein a distance between a splicing seam between the first display panel and the second display panel, and a splicing seam between the third display panel and the dimming LCD panel is 1 to 4 times of a pixel width; orthographic projections of the display region of the first display panel and the display region of the second display panel onto the reference plane are at least partially overlapped with an orthographic projection of the dimming region of the third display panel onto the reference plane; and the orthographic projection of the display region of the second display panel onto the reference plane is at least partially overlapped with an orthographic projection of a dimming region of the dimming LCD panel onto the reference plane;
  - a light adjusting layer comprising a first sub-adjusting layer and a second sub-adjusting layer, wherein the first sub-adjusting layer comprises a first curved portion and is disposed on a light-emitting side of the first display panel, wherein an orthographic projection of the first curved portion onto the first display panel covers the first edge sealing region; and the second sub-adjusting layer comprises a second curved portion, and is disposed on a light-emitting side of the second display panel, wherein an orthographic projection of the second curved portion onto the second display panel covers the second edge sealing region, an orthographic projection of the second curved portion onto the third display panel covers the third edge sealing region, and an orthographic projection of the second curved portion onto the dimming LCD panel covers the fourth edge sealing region; and
  - a first polarizer, a second polarizer, and a third polarizer, wherein the first polarizer is disposed on the light-emitting sides of the first display panel and the second display panel, and is provided with a first opening, wherein an orthographic projection of the first opening onto the reference plane covers orthographic projections of the first edge sealing region and the second edge sealing region onto the reference plane; the second polarizer is disposed on backlight sides of the third display panel and the dimming LCD panel, and is provided with a second opening, wherein an orthographic projection of the second opening onto the reference plane covers orthographic projections of the third edge sealing region and the fourth edge sealing region onto the reference plane; the third polarizer is disposed on the backlight sides of the first display panel and the second display panel, and is disposed on the light-emitting sides of the third display panel and the dimming LCD panel; wherein a direction of a polarization axis of the first polarizer is parallel to a direction of a polarization axis of the second polarizer, and is perpendicular to a direction of a polarization axis of the third polarizer.

10. A method for manufacturing a display module, comprising:
- manufacturing a first display panel, a second display panel, and a third display panel, wherein the first display panel, the second display panel, and the third display panel are all liquid-crystal display (LCD) panels, the first display panel comprises a first edge sealing region, and the second display panel comprises a second edge sealing region;
- disposing the first display panel and the second display panel in a same layer, and splicing the first display panel and the second display panel, such that the first edge sealing region is abutted against the second edge sealing region;
- disposing the third display panel on backlight sides of the first display panel and the second display panel, such that both an orthographic projection of the first edge sealing region onto the third display panel and an orthographic projection of the second edge sealing region onto the third display panel to fall within a display region of the third display panel;
- forming a light adjusting layer on light-emitting sides of the first display panel and the second display panel;
- forming a first polarizer on the light-emitting sides of the first display panel and the second display panel, wherein the first polarizer is provided with a first opening, an orthographic projection of the first opening onto the reference plane covering orthographic projections of the first edge sealing region and the second edge sealing region onto the reference plane;

forming a second polarizer on backlight sides of the third display panel and the dimming LCD panel, wherein the second polarizer is provided with a second opening, an orthographic projection of the second opening onto the reference plane covering orthographic projections of the third edge sealing region and the fourth edge sealing region onto the reference plane; and forming a third polarizer between the backlight sides of the first display panel and the second display panel, and light-emitting sides of the third display panel and the dimming LCD panel;

wherein a direction of a polarization axis of the first polarizer is parallel to a direction of a polarization axis of the second polarizer, and is perpendicular to a direction of a polarization axis of the third polarizer.

11. The method according to claim 10, wherein
the third display panel comprises a dimming region; and
disposing the third display panel on the backlight sides of the first display panel and the second display panel further comprises:
   disposing the third display panel on backlight sides of the first display panel and the second display panel, such that an orthographic projection of a display region of at least one of the first display panel and the second display panel onto a reference plane is at least partially overlapped with an orthographic projection of the dimming region onto the reference plane, wherein the reference plane is parallel to a display surface of the display module.

12. The method according to claim 10, wherein
the third display panel comprises a third edge sealing region; and
the method further comprises:
   manufacturing a dimming LCD panel comprising a fourth edge sealing region; and
   disposing the dimming LCD panel and the third display panel in a same layer, and splicing the dimming LCD panel and the third display panel, such that the fourth edge sealing region is abutted against the third edge sealing region, wherein an orthographic projection of a display region of at least one of the first display panel and the second display panel onto a reference plane is at least partially overlapped with an orthographic projection of a dimming region of the dimming LCD panel onto the reference plane.

13. The method according to claim 10, wherein forming the light adjusting layer on the light-emitting sides of the first display panel and the second display panel comprises:
   forming a first sub-adjusting layer on a light-emitting side of the first display panel, wherein the first sub-adjusting layer comprises a first curved portion, an orthographic projection of the first curved portion onto the first display panel covering the first edge sealing region; and
   forming a second sub-adjusting layer on a light-emitting side of the second display panel, wherein the second sub-adjusting layer comprises a second curved portion, an orthographic projection of the second curved portion onto the second display panel covering the second edge sealing region.

14. A display device, comprising the display module as defined in claim 1.

15. The display device according to claim 14, further comprising:
   a front frame comprising a front frame bending portion parallel to the first display panel; and
   a light-shielding foam disposed between the front frame bending portion and the first display panel.

16. The display device according to claim 15, wherein
the display module further comprises a dimming liquid-crystal display (LCD) panel; and
a splicing seam between the first display panel and the second display panel is a first splicing seam, and a splicing seam between the third display panel and the dimming LCD panel is a second splicing seam, wherein a width of the front frame bending portion is greater than or equal to a distance between the first splicing seam and the second splicing seam.

* * * * *